United States Patent [19]

Stoken

[11] 4,405,267
[45] Sep. 20, 1983

[54] THREADING DEVICE

[76] Inventor: Donald R. Stoken, 1040 Eighth Ave. No. 3, Longview, Wash. 98632

[21] Appl. No.: 293,377

[22] Filed: Aug. 17, 1981

[51] Int. Cl.[3] .......................... B23G 1/30; B23G 1/46; B23G 1/48; B23G 1/52
[52] U.S. Cl. ................................ 408/101; 10/89 P; 10/107 R; 10/123 P; 408/104
[58] Field of Search ............ 10/1 B, 88, 89 P, 107 R, 10/107 PH, 111, 120, 123 R, 123 P; 408/97, 98, 101, 102, 104, 105, 106, 218, 221, 241

[56] References Cited

U.S. PATENT DOCUMENTS

| 798,722 | 9/1805 | Wright | 408/104 |
| 932,989 | 8/1809 | La Vine | 10/107 R |
| 1,679,988 | 9/1875 | Chamberlin et al. | 10/88 |
| 4,349,931 | 9/1982 | Leon | 10/123 P |

FOREIGN PATENT DOCUMENTS 629831  9/1949  United Kingdom ............. 10/123 P

Primary Examiner—Ervin M. Combs
Attorney, Agent, or Firm—Oliver D. Olson

[57] ABSTRACT

A threading device comprises a longitudinally adjustable, C-shaped frame configured with mounting heads at its open ends, the heads being arranged to interchangeably mount a collet for supporting a rod or pipe to be threaded and a threaded die guide shaft mounting a thread cutting die, the pipe or rod and the die guide shaft being secured by set screws so that their confronting ends are in aligned abutment with each other intermediate said mounting heads. Rotation of the threading die on the guide shaft moves the die onto the pipe or rod to form precisely arranged threads on the latter.

5 Claims, 3 Drawing Figures

THREADING DEVICE

BACKGROUND OF THE INVENTION

This invention relates to the cutting of threads in pipe, bolt or rod material, and more particularly to a novel tool by which to facilitate the quick, positive and precise starting, cutting and chasing of threads in such materials.

It has been the practice heretofore to thread pipe or rod material by mounting the same in a vise and pressing a cutting die against the end of the material and turning the die so as to cause it to tap itself into the material and move itself longitudinally along the material using the newly cut threads as support for the cut.

Often, however, the material to be threaded may resist starting of the die, requiring excessive amount of physical force or necessitating additional preparation, such as grinding or filing the end of the material for proper acceptance of the die. Further, the die may not be squared properly to the axis of the material at the start, resulting in misaligned threads or the development of such compound stresses as to cause breakage of the die. These problems result in considerable loss of production time and often in loss of expensive materials and dies.

SUMMARY OF THE INVENTION

In its basic concept, the threading device of this invention supports a pipe or rod material to be threaded in precise aligned abutment with a threaded die guide that mounts a cutting die for movement from the die guide onto the abutting pipe or rod material.

It is by virtue of the foregoing basic concept that the principal objective of this invention is achieved; namely, the provision of precisely formed threads on a piece of pipe or rod material with speed and facility by inexperienced personnel.

Another objective of this invention is the provision of a threading tool of the class described which utilizes a threaded shaft abutting the end of pipe or rod material to be threaded, the shaft threads providing a supporting guide for achieving the positive, forced entry of a companion cutting due onto the pipe or rod material and thereby insuring precise formation of threads on the material.

Another object of this invention is the provision of a threading tool of the class described by which threads may be cut on a piece of material in either clockwise or counterclockwise rotation and from the right or left.

Another object of this invention is to provide precise matching of the die with the existing thread of a bolt or the like in the chasing of a damaged thread.

A further object of this invention is the provision of a tool of the class described which includes a mounting frame that is adjustable longitudinally to provide for cutting variable lengths of threading.

A still further object of this invention is the provision of a threading tool of the class described which is of simplified construction for economical manufacture.

The foregoing and other objects and advantages of this invention will appear from the following detailed description, taken in connection with the accompanying drawings of a preferred embodiment.

DESCRIPTION OF THE PREFERRED EMBODIMENT

Figure 2:
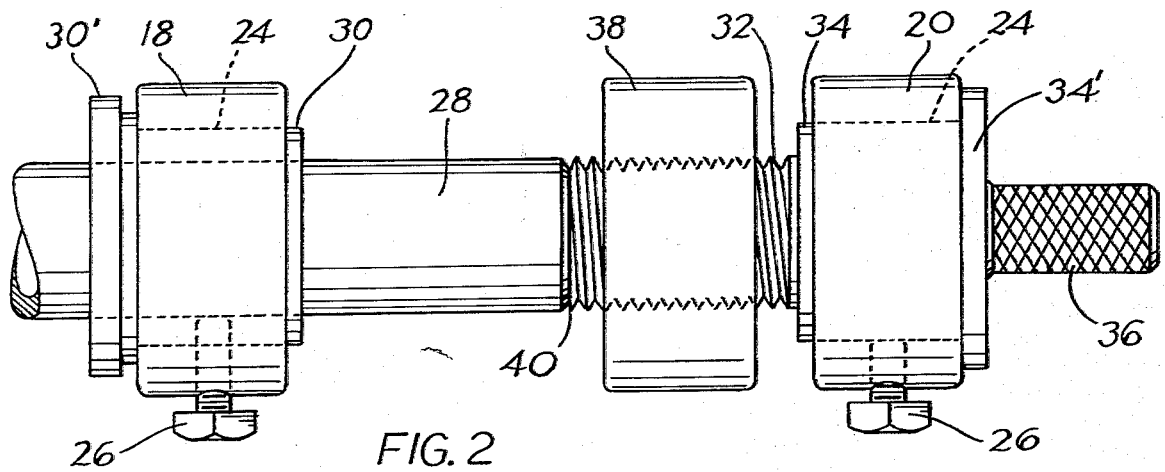
FIG. 2 is a fragmentary plan view of the device of FIG. 1

The threading device of this invention is illustrated in the drawings as including a two piece, longitudinally adjustable C-shaped frame comprising base members 10 and 12 which mount vertical end members 14 and 16, respectively. The upper portions of the vertical members 14 and 16 are formed as enlarged mounting heads 18 and 20, respectively.

Figure 1:
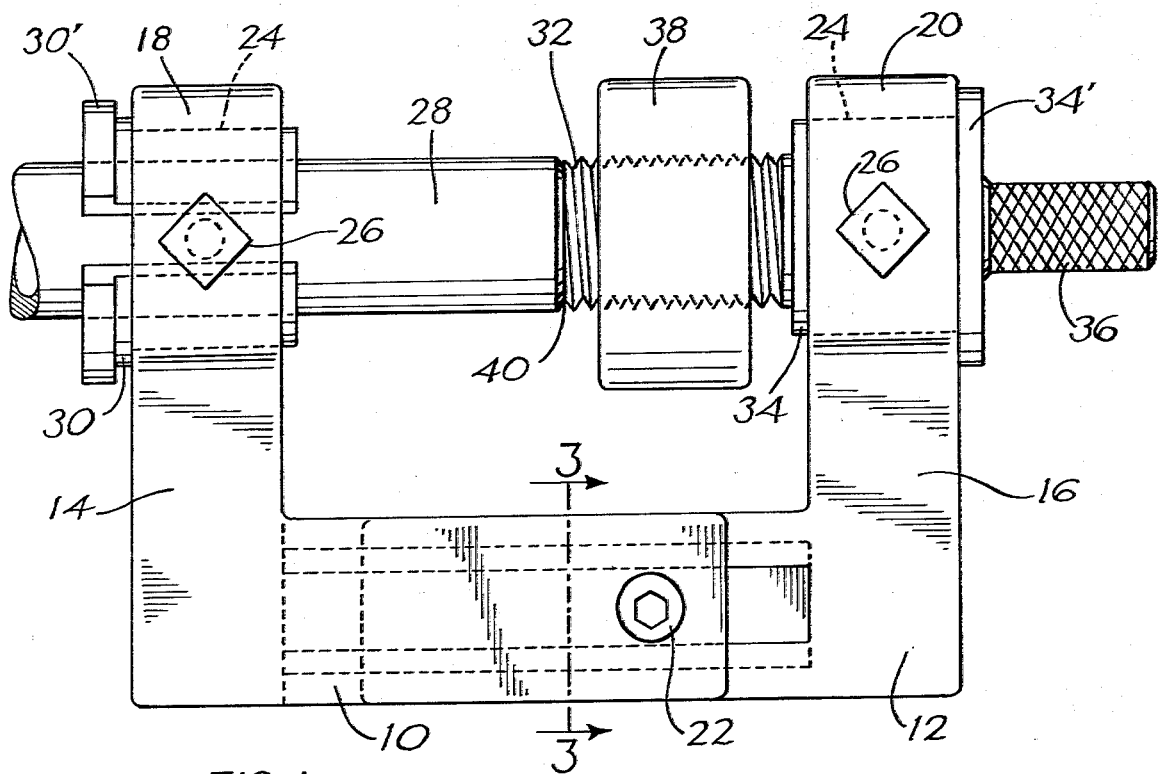
FIG. 1 is a fragmentary view in side elevation of a threading device embodying the features of this invention, the device mounting a piece of rod material to be threaded in aligned abutment with a threaded die guide supporting a cutting die thereon.
Figure 3:
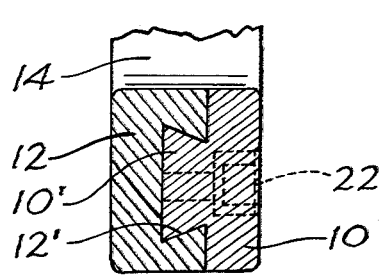
FIG. 3 is a fragmentary sectional view taken along the line 3—3 in FIG. 1.

As best shown in FIGS. 1 and 3, base member 10 incorporates on its inside surface a dovetail flange 10' and base member 12 incorporates on its inside surface a dovetail groove 12' which is arranged to slidably receive the flange 10'. The outside surfaces of members 10 and 12 are configured flat and parallel so that they may be clamped in the jaws of a vise. The vise not only supports the frame, it may also secure the frame in a predetermined position of longitudinal extension. However, a clamp screw 22 may be threaded into one of the base members, for example base member 10, for releasable clamping engagement with the other base member, to secure them together.

Mounting heads 18 and 20 provide means for interchangeably mounting a threading die assembly and a piece of pipe or rod material to be threaded. Each head has a bore 24 therethrough disposed on a common longitudinal axis. There is also provided a threaded bore in each head, perpendicular to the bore 24, arranged to receive a set screw 26 operable to intercept the bore 24.

In FIGS. 1 and 2 the material to be threaded is shown as a bolt shank or other form of rod 28. It is mounted in a split collet 30 arranged to be received removably in one of the bores 24, preferably of either mounting head 18 or 20. For this purpose both bores are provided with the same diameter. The inside diameter of the collet is configured to correspond with the outside diameter of the rod, thereby precisely aligning the rod on the axis of the bore 24. The collet is arranged in the bore with its split edge disposed to allow the set screw 26 passage for contact with the rod. Thus, when the set screw is tightened, the rod is secured against movement relative to the head 18. A shoulder 30' on the collet provides an abutment with the head.

The threading device of this invention also includes a threading die assembly which includes a threaded guide shaft 32 extending from one end of a base 34, preferably configured to be receivable removably within the bores 24 of either head 18 or 20. For this purpose, both bores 24 are of the same diameter, as are the outer diameters of the collet 30 and base 34. The base 34 incorporates an end shoulder 34' which provides an abutment for the outside end surface of the head. A handle 36 is provided for convenience of manipulating the die assembly. The die assembly also includes a thread cutting die 38 chosen to match the threads of guide shaft 32.

After the die guide shaft 32 is secured to one head, for example the head 20, and the cutting die 38 is screwed onto the guide shaft, the rod 28 is mounted in collet 30 and secured to the other head 18 with the inner end of the rod abutting the confronting end of the shaft 32. The mutual abutment surfaces are indicated by numeral 40. As shown, the longitudinal axis of the rod 28 and the threaded die guide shaft 32 are in alignment.

The operation of the threading tool thus described is as follows: With the frame parts adjusted to the desired position of longitudinal extension to space the heads 18 and 20 apart the desired distance, the set screw 22 is tightened, if provided, and/or the frame base members 10 and 12 are clamped together in a vise.

For a piece of pipe or rod material to be threaded, a die assembly which has a shaft 32 diameter corresponding to the diameter of the material is selected and inserted into the bore 24 of either head 18 or 20, as desired. The base 34 of the die assembly is secured in the selected bore by means of the set screw 26, and the appropriate cutting die 38 is turned onto the shaft 32.

A collet 30 with an inside diameter equal to the outside diameter of rod or pipe material 28 is inserted into the opposite head so that the split in the collet is aligned with the set screw 26. The material is then inserted through the collet until the inner end of the material abuts the confronting inner end of the shaft 32. The set screw 26 then is tightened, thereby firmly securing the shaft 32 and the material 28 to be cut together in precise axial alignment.

The cutting die 38 is then rotated along the guide shaft 32 until it comes into contact with the rod or pipe 28. Continued turning of the cutting die transfers it onto the material 28 in precise manner. The die is continued to be turned until it has cut a desired length of threads on the material.

It is understood that any suitable means for turning the cutting die may be employed. For example, the die may be configured with a round outer surface for engagement by a pipe wrench, or the outer surface may be configured square or hexagonal for association with a conventional wrench. The die may also be configured for engagement by a ratchet type wrench, if so desired.

After threads have been cut a desired distance along the material 28, the cutting die is then reverse-rotated back onto the shaft 32 and the set screw 26 is released from engagement with the material and the latter is removed. If more than one piece of material is to be similarly threaded, a new piece is inserted through the collet and into abutment with the die guide shaft 32 and the set screw 26 is retightened. The cutting process is repeated.

Accordingly, it will be appreciated that the threading device of this invention provides for precise alignment of the cutting die relative to the material to be threaded, and provides a secure base for the cutting die to bear against while starting the thread cut into the material. In this manner there is no tendency for the cutting die to wobble, or cut into the material at an angle, or strip the beginning threads.

It is to be understood that there may be provided a wide variety of die assemblies of differing shaft diameters and corresponding cutting dies for a variety of thread diameters and pitches. In each case, the die assembly base 34 is provided with the same outside diameter as the bore 24 of the heads. There is also provided a number of collets 30 configured with inside diameters to accommodate a corresponding variety of diameters of rod or pipe material to be threaded.

It is also to be understood that while the threading device is illustrated herein as including a longitudinally adjustable frame, the frame may be provided of unitary construction if adjustability is not required.

It will be apparent to those skilled in the art that the foregoing and various other changes may be made in the size, shape, type, number and arrangement of parts described hereinbefore without departing from the spirit of this invention and the scope of the appended claims.

Having thus described my invention and the manner in which it may be used, I claim:

1. A device for threading a length of pipe or rod material, comprising:
    (a) a frame,
    (b) a threaded die guide shaft,
    (c) a thread-cutting die mounted on said threaded die guide shaft for movement along the threads thereof,
    (d) shaft mounting means mounted on said frame for releasably securing said threaded die guide shaft thereto, and
    (e) material mounting means on said frame for releasably securing a length of material to be threaded in end abutment and axial alignment with said threaded die guide shaft for enabling transfer of said thread cutting die from said threaded guide shaft onto said material to effect threading thereof.

2. The threading device of claim 1 wherein said threaded die guide shaft and said material mounting means are arranged on said frame for interchangeability.

3. The threading device of claim 1 wherein said material mounting means includes a collet mounted removably on said frame and having an inside diameter for receiving a corresponding diameter of material to be threaded.

4. The threading device of claim 1 wherein said frame comprises two interengaging frame members arranged to move said shaft mounting means and said material mounting means longitudinally toward and away from each other.

5. The threading device of claim 4 including a longitudinal dovetail flange on one of said frame members and a longitudinal dovetail groove in the other of said frame members slidably receiving the dovetail flange therein.

* * * * *